July 8, 1969  A. W. MOORE  3,453,927
RIVET
Filed Sept. 27, 1967
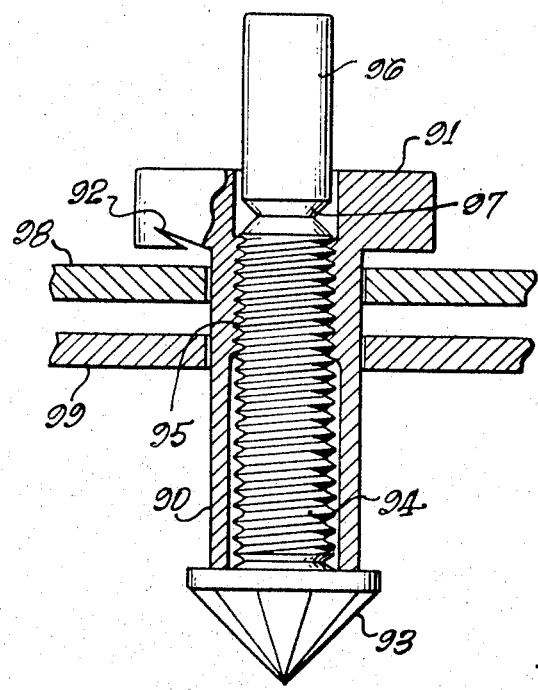
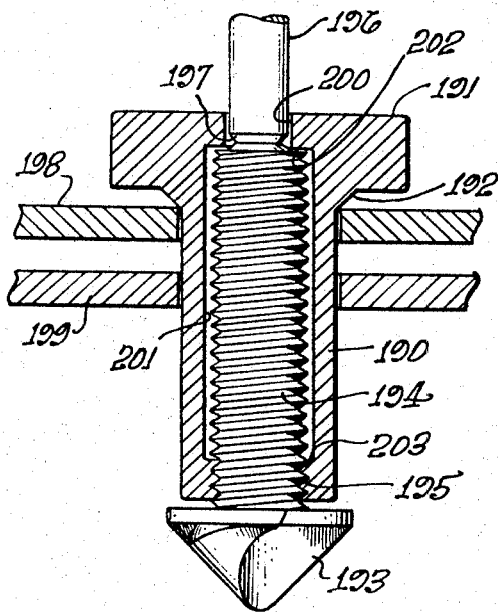
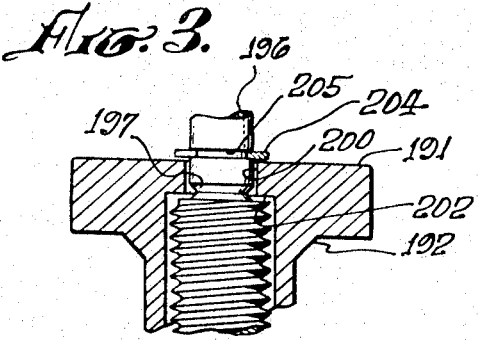
INVENTOR.
ANTHONY W. MOORE,
By Herbert C. Schulz
ATTORNEY.

United States Patent Office 3,453,927
Patented July 8, 1969

3,453,927
RIVET
Anthony W. Moore, 5173 Hallwood,
Riverside, Calif. 92506
Filed Sept. 27, 1967, Ser. No. 670,940
Int. Cl. F16b 13/04, 33/04
U.S. Cl. 85—68          3 Claims

ABSTRACT OF THE DISCLOSURE

This is an invention of a rivet which has a self-drilling feature in which a threaded shank is inserted into a hollow rivet, said shank having a drill tip and said shank, also, having an area of reduced strength to cause it to break away at a torque when the rivet has been collapsed. The rivet drill tip drills its own hole and has means provided to grip the material being riveted so it does not turn after piercing the material. Other means are incorporated, either by use of the drill tip itself, or by a threaded collar arrangement, to cause the rivet to collapse and fasten the materials together; at a pre-set torque, the pre-determined breaking point of the shank is reached and further tightening is not possible.

BACKGROUND OF THE INVENTION

Field of the Invention

The invention is in the general field of rivets, and particularly of rivets designed for self-drilling and for utilization in blind areas where one side of the rivet can not be reached for work.

Description of the prior art

The prior art in this field consists of many endeavors to supply a proper fastening device, either having a self limiting torque means, or the like. Also, there have been considerable attempts to make a self-drilling rivet device, but such attempts have not achieved the results of this invention due to the difficulty of handling the drilling elements when it is desired to collapse and utilize the rivet. The prior endeavors have had to do with elements of the so-called pop rivet type, of self-drilling rivets which require special tooling and adaptation for proper use in blind areas, and similar such limitations.

SUMMARY

The invention comprises a rivet in which the rivet has an enlarged head with an elongated hollow, tubular, portion, and means adjacent the head to lock the rivet in position upon materials being joined with the rivet to prevent turning of the rivet during fastening.

This rivet has a removable shank within the hollow area, which is so constituted and connected to the hollow rivet that upon continued turning of the shank, the rivet is caused to collapse and fasten the materials being joined together.

In addition, the shank is provided with an area of reduced strength, such that it will break off when sufficient torque has been reached so that further tightening is not possible to the point where the rivet would be pulled through the material, or other damage occur.

It is an object of this invention to provide a self-drilling rivet which can be utilized with a customary, portable drill.

Another object of this invention is to provide such a rivet as described in which the shank will break when proper torque has been reached, so that the rivet will not be caused to pull through, or otherwise damage, the articles being joined together.

The foregoing and other objects and advantages will be clear to those skilled in the art upon reading the following complete description, together with a consideration of the drawings attached.

BRIEF DESCRIPTION OF THE DRAWINGS

FIGURE 1 illustrates a preferred embodiment of the originally filed patent application, heretofore referred to, and of which this application is a continuation in part, said drawing being illustrated in partial section;

FIGURE 2 is a partial section of the preferred embodiment of the extended and improved alternate to the originally designed and developed rivet; and FIGURE 3 is a partial section of the top portion of FIGURE 2 with a modification.

DESCRIPTION OF THE PREFERRED EMBODIMENTS

FIGURE 1 illustrates a rivet in which the rivet comprises a head 91 having locking tabs 92 and threads at 95 with a tubular extension 90.

A shank 96 with a reduced area 97 and threaded portion 94 extends through the tubular portion and the threads are engaged in threads 95. An enlarged drill portion 93 is attached to the threaded portion 94 and is in contact with the extended portion of the rivet 90.

In use, materials to be fastened together, such as two pieces of metal or the like 98 and 99, are placed in proximity to one another and the rivet is gripped by its shank 96 in the chuck of a drill or the like. The drill tip 93 comprising a plurality of hardened cutting edges drills its own hole through the two pieces 98 and 99 and thereafter the rivet is pressed through until the head 91 comes in contact with the material 97 and is held by the locking tip 92 against twisting. Thereafter as the shank 96 is continued in its rotation the enlarged drill tip 93 will pull back through the threads 95 and 94 and force the portion 90 to collapse outwardly to fasten the two pieces of sheet metal and the like together. Upon reaching its full compressive strength, the shank will break off at the reduced portion 97.

FIGURE 2 illustrates a rivet in which the rivet comprises a head 191, having a tapered shoulder 192 which serves the function of providing a friction grip against the materials 198 and 199 being joined together. A hollow tubular extension from the shoulder is indicated at 190.

A shank 196 with a reduced area 197 and a threaded portion 194 is shown in place within the tubular rivet.

It will be observed that the hollow part of the rivet comprises a short, hollow, portion 200 with a slightly enlarged hollow portion 201, having a shoulder 202 between them. At the other end of the hollow portion, there is indicated a reduced diameter shoulder 203, having threads as indicated, matching with threads 195 on the shank.

The threaded portion 194 is of large enough diameter, as will be clear from the drawing, that the upper, flat, portion thereof will come in contact with the shoulder 202 of the rivet. The shank 196 is of reduced size so that it can pass through the reduced opening 200 and threaded area 203.

The drill tip 193 is formed integrally with, or otherwise attached to, the threaded shank 194.

The rivet is normally formed by making the shank portion, including its drill tip, as one piece. The rivet portion is a second piece. The two are assembled by inserting the reduced diameter shaft 196 through the threaded reduced area portion 203, and screwing the threaded portion up into the hollow rivet until the shoulder at the top of the threaded portion 194 comes in contact with the shoulder 202 at the same time the upper portion of the drill tip comes in contact with the lower portion of the hollow rivet.

In use, the materials to be fastened together, such as two pieces of metal or the like 198 and 199, are placed in proximity to one another and the rivet is gripped by its shank 196 in the chuck of a drill or the like.

The drill tip 93, which can be nearly any type drill, drills its own hole. During this portion of the operation, the rivet is turning as a unit with the drill tip, sufficient friction being provided between the points of contact of the shoulder at the top and drill tip at the bottom to maintain them together.

When the drill tip completely pierces the materials being together, the rivet is driven suddenly through and the shoulder 192 binds, because of its tapered nature, on the material 198. This then holds the rivet from turning and allows the threaded shank 194 to pull the threaded rivet portion 203 upward upon it. The shoulder 202 prevents the shank from having a tendency to move with relation to the rivet as the rivet is pulled upward and collapsed.

It will be clear to those skilled in the art that depending upon the direction of rotation of the shank, the threaded areas and threads will have to be relatively correct so that the rivet pulls upward on the shank, rather than the shank having a tendency to pull down into the rivet.

If it is desired to completely confine the shank so that it cannot move up or down, a snap ring 204 or the like as indicated in FIGURE 3 will be used to hold the shank completely in position. This snap ring fits into a groove 205 on the shank. During assembly, after the entire item is assembled, the snap ring is snapped into the groove and extends out over the top of the hollow rivet. Thus, in this modification, it becomes impossible for the rivet shank to be accidently screwed down and away in the wrong direction.

After the shank has been collapsed by means of this screw device, and sufficient torque has been reached, the upper part of the shank 196 will break off at the reduced area 197, so that nothing protrudes above the top of the rivet. By this means there can be no damage or pulling of the rivet through the materials being fastened by excessive force being applied to the rivet.

When the rivet, in any of its modifications, is used, the continued turning action of the threaded shank pulls the lower, hollow, portion upward and causes it to bulge outwardly on the underside, or the side away from the head, of the materials being joined. The continued, upward action and this bulging tendency, pulls the materials being joined tightly together. Therefore, the rivet will have either split and deformed, or deformed in a uniform bulge, or otherwise, beyond the material 199 to pull of the materials of 198 and 199 together and hold them together.

When the proper force has been applied, continued turning will cause a fracture at 197, thus leaving the two pieces joined neatly and permanently together by the rivet, and because of the location of the reduced area 197, it will be possible that the top of the rivet will be smooth, with a small depression in the center which can, if, desired, be filled with plastic, putty, or other material to make an entirely smooth top portion.

While the embodiments of this invention as illustrated and described are fully capable of achieving the objects and advantages desired, it is not my intent to be limited thereby. Such illustrations and descriptions are for illustrative purposes only. It will be clear to those skilled in the art that modifications can be made without departing from the inventive concepts disclosed.

I claim:

1. A rivet comprising an elongated, hollow portion terminating at one end in a radially enlarged head, said elongated, hollow portion having a radially directed internal shoulder at the end thereof adjacent said head and having a permanently deformable tubular extension adapted to extend beyond one side of members being joined together, said tubular extension having internal threads at the end thereof opposite said head; a shank passing through said elongated, hollow portion having external threads thereon to engage the threads in said hollow portion to cause it to deform the internal diameter of said elongated, hollow portion between said internal shoulder and said internal threads being greater than the maximum diameter of said shank, said shank having shoulder means of a diameter greater than that of said internal shoulder to hold said shank within said hollow portion in cooperation with said internal shoulder said shank having a drill tip of a size sufficient to drill a hole to allow said elongated, hollow, portion to pass through members being joined together; and said shank having means extending beyond the head of said elongated, hollow portion for applying torque to said shank.

2. The device of claim 1, in which said head has means for locking against movement, relative to the members being joined together.

3. The device of claim 1, in which the said shank has been provided with means on the outer side of said rivet head to prevent relative axial motion between said rivet and said shank in either direction.

References Cited

UNITED STATES PATENTS

| 1,929,743 | 10/1933 | Jarvis et al. | 85—70 |
| 3,247,754 | 4/1966 | Bieser | 85—68 |
| 3,288,016 | 11/1966 | Reynolds | 85—70 |
| 3,304,829 | 2/1967 | Raynovich | 85—70 |
| 3,343,443 | 9/1967 | Moore | 85—68 |
| 3,316,796 | 5/1967 | Young | 85—68 |

FOREIGN PATENTS

| 684,821 | 12/1952 | Great Britain. |
| 241,038 | 4/1960 | Australia. |

RAMON S. BRITTS, *Primary Examiner.*

U.S. Cl. X.R.

85—70, 72; 151—69